Sept. 9, 1958 S. L. EVANS 2,850,791
PIVOT POLISHING MACHINE
Filed Jan. 20, 1955 2 Sheets-Sheet 1

INVENTOR
SAMUEL L. EVANS
BY M. W. Gould
ATTORNEY

Sept. 9, 1958　　　　　　S. L. EVANS　　　　　2,850,791
PIVOT POLISHING MACHINE
Filed Jan. 20, 1955　　　　　　　　　　　2 Sheets-Sheet 2
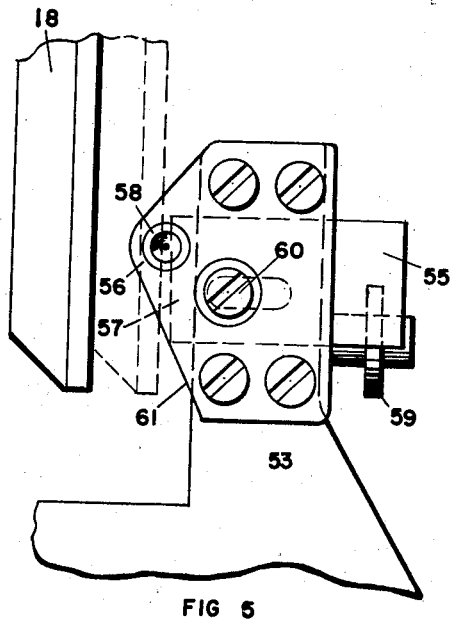
FIG 5
FIG. 6
FIG. 7
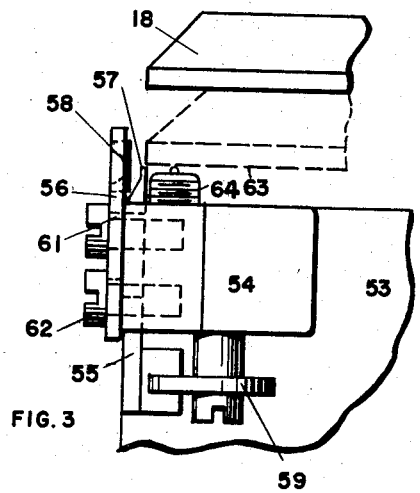
FIG. 3
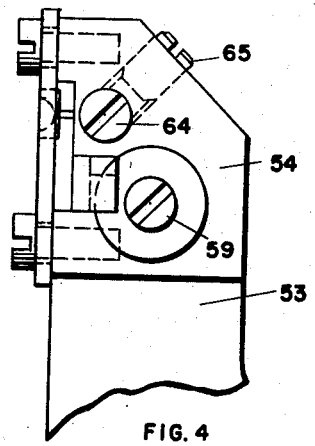
FIG. 4
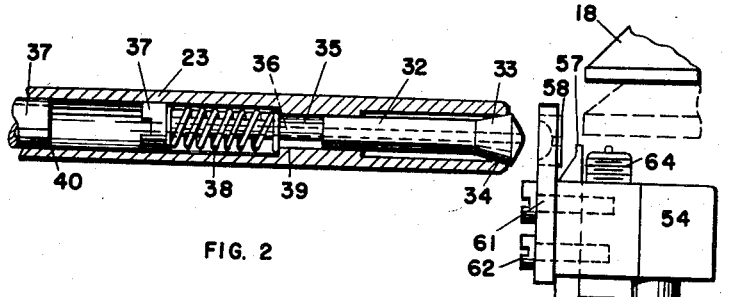
FIG. 2
INVENTOR
SAMUEL L. EVANS
BY
ATTORNEY

United States Patent Office 2,850,791
Patented Sept. 9, 1958

2,850,791

PIVOT POLISHING MACHINE

Samuel L. Evans, Lancaster Township, Lancaster County, Pa., assignor to Hamilton Watch Company, Lancaster, Pa.

Application January 20, 1955, Serial No. 483,118

2 Claims. (Cl. 29—90)

This invention relates to an improvement in machines for burnishing or polishing the pivots of balance staffs for watches.

The object of the invention is to provide a means for bringing the pivot end of a balance staff into contact with the burnisher while both the balance staff and burnisher are spinning.

The improvement to this particular machine is directed to the spindle and chuck for holding the balance staff in position while it is turning. Heretofore, the balance staff has been supported in a chuck with the pivot end protruding and the burnisher brought against the freely turning pivoted end. It is now desired to support one end of the balance staff in the chuck and support the free end of the balance staff closely adjacent the burnisher by a carboloy shell which will produce a truer turning and a finer finish to closer tolerances of the pivot.

A further object of the present invention is to burnish the pivot of a balance staff to very close dimensions.

It is a still further object of the present invention to provide a chuck and spindle which, after the burnishing operation is completed, will withdraw the balance staff from the supporting carboloy shell in exact straight line motion to prevent possible scratching or marring of the burnished finish on the pivot.

The invention is illustrated in the accompanying drawings in which:

Figure 2 is an enlarged detail view of a spindle, chuck and rest for the workpiece.

Figure 3 is a top elevation of the rest for the pivot end of the workpiece.

Figure 4 is a front elevation of the mechanism shown in Figure 3.

Figure 5 is a view looking toward the rest from the chuck.

Figure 6 is a view of the workpiece actual size.

Figure 7 is an enlarged view of the workpiece.

Figure 1:
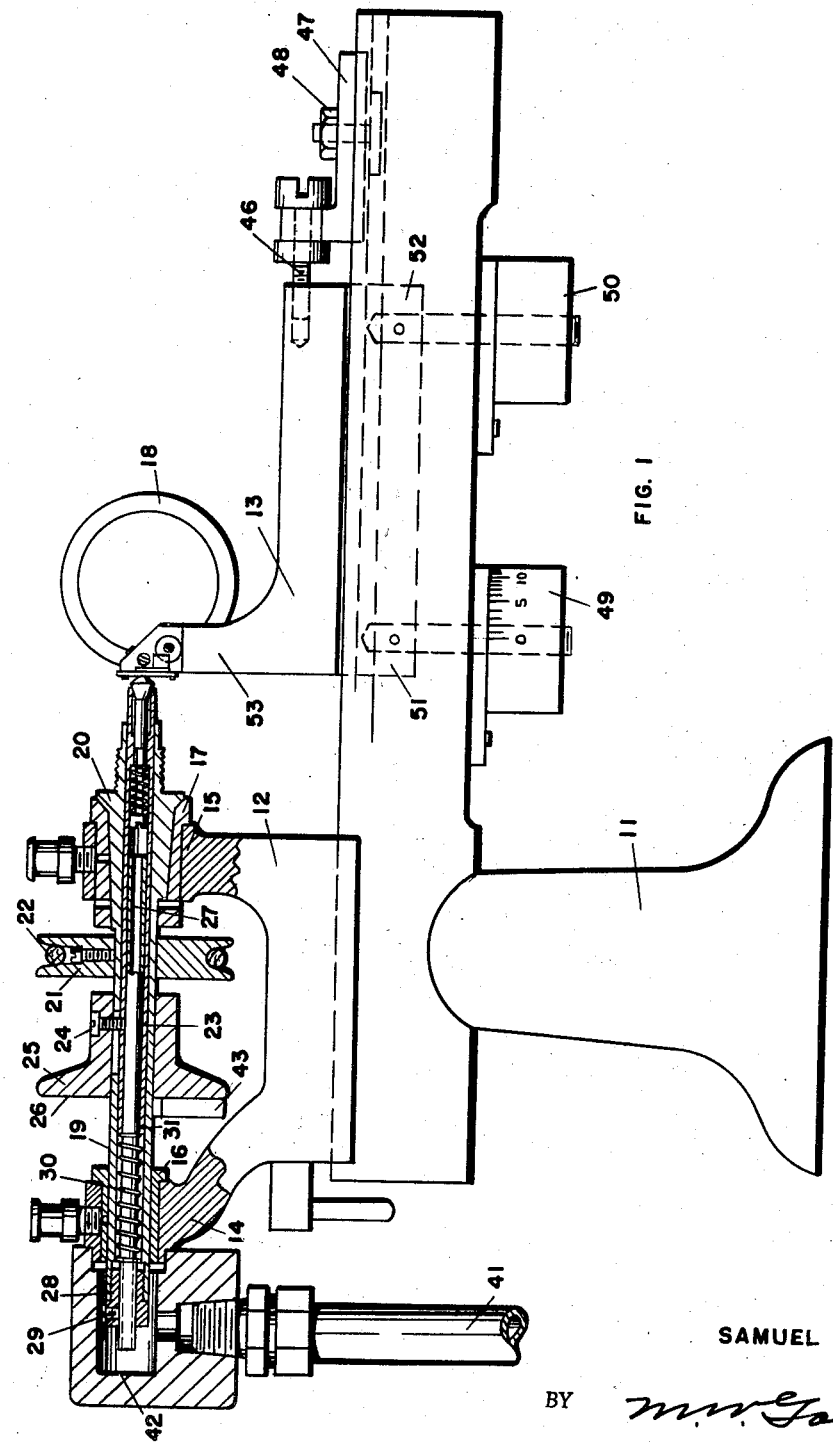
Figure 1 is a side view partly in section of the machine.

A base 11 supports a spindle head 12 and an adjustable steady rest 13 slidably mounted thereon. The spindle head is formed with a rear bearing support 14 and a front tapered bearing support 15 which have bearings 16 and 17 respectively mounted thereon. A burnishing wheel 18 is mounted for rotation on apparatus (not shown) at a point adjacent the workpiece supporting end of the adjustable steady rest.

A spindle 19 is formed with a tapered end 20 and mounted for rotation in the bearings 16 and 17. A driving pulley 21 driven by belt 22 drives the spindle.

An inner sleeve 23 carried within the spindle is keyed to the spindle by a screw 24 mounted in an operating knob 25 and longitudinally movable in slot 26 of the spindle 20 to permit rotational and longitudinal movement of the sleeve 23 within the spindle 20. A tube 27 is mounted within the sleeve and projects beyond the back end of the spindle which is closed by a nut 28 threaded into the spindle and carrying a set screw 29 which engages the tube 27 to prevent relative longitudinal movement of the tube 27 and the spindle 20. A coil spring 30 is mounted on the tube 27 and abuts the nut 28 and the rear end 31 of the sleeve 23 to constantly urge the sleeve to the forward end of the spindle.

The forward end of the spindle houses a chuck 32 having the usual tapered face 33 engaged by the tapered jaw 34 of the sleeve 23. The chuck 32 is held in position by a threaded bolt 35 which has a longitudinal bore 36 in a screw curved head 37. A coil spring 38 is carried on said bolt between the head 37 and an interior annular shoulder 39 of the sleeve 23, the spring tending to hold the jaw 34 into contact with the chuck 32 to maintain the chuck in closed position. Longitudinal movement of the sleeve 23 by manually moving the operating knob 25 towards the rear of the spindle moves the sleeve 23 on the tube 27 and within the spindle 20 until the head 37 of the bolt engages the end 40 of the sleeve 27 stopping the movement of the chuck 32. Subsequent rearward movement of the sleeve 23 releases the chuck from the jaw 34 permitting the workpiece to be discharged from the chuck through the action of compressed air entering from the hose 41 into the end chamber 42 and the tube 27, through the longitudinal bore 36 of the bolt 35. The compressed air is operated by a lever 43 engaged by the operating knob near the end of its longitudinal movement to operate a valve in an air line (not shown).

The steady rest 13 is slidably adjustable longitudinally of the base 11 through an adjusting screw 46 which is mounted on an adjustable support 47 also adjustable longitudinally by means of the nut 48. Micro adjustments 49 and 50 located at the forward end 51 and the rear end 52 of the steady rest provide means for adjusting the level of the steady rest and its relation to the workpiece held in the chuck. The steady rest 13 is formed with a vertical section 53 terminating in a supporting base 54 on which are mounted a pair of adjustable plates 55 and 56. The plate 55 is reduced in thickness at one edge and formed with a supporting rest 57 on which the pivot end to be burnished rests. Plate 56 is formed with a bearing opening 58 through which the pivot is inserted. Both of these plates may be adjusted by means of either of the micro screws 49 or 50. The plate 55 may be adjusted laterally of the machine and relative to the burnishing wheel 18 through the set screw 59 and held in position by the locking screw 60. Plate 56 is slightly adjustable by reason of the clearances 61 around the screws 62. A diamond stop 63 mounted on the end of screw 64 limits the motion of the burnishing wheel and is held in locked position by set screw 65. The bearing 58 may be formed of carboloy as well as the rest 57 to prevent wear.

With this machine the number of pieces spoiled has been reduced to less than ½ %, probably due to the fact that with the bearing 58 and the rest 57 the pivot end is held against any possible lateral movement while in contact with the burnishing wheel. This is a decided improvement over the previous machine in which the piece was mounted in a chuck and the end projected freely to engage the burnishing wheel.

What is claimed is:

1. A semi-automatic machine for polishing the pivots of balance staffs, comprising a base, a spindle formed with a chuck engaging end supported by said base for rotation and longitudinal reciprocation, means for rotating said spindle, means for moving said spindle longitudinally of its axis of rotation while rotating, a retractible chuck supporting said staff mounted in the chuck engaging end of said spindle, said spindle moving means serving to retract said chuck, a stop for arresting the longitudinal movement of said chuck while permitting continued movement of said spindle to release said chuck from engagement with said spindle, a rotating burnishing wheel, a bearing receiving the end of the balance staff back of the section to be burnished, a rest carried by said base and receiving the pivot end of said staff and supporting said end while in engagement with said burnishing wheel, the burnishing wheel engaging the staff between the bearing and the rest means for limiting the burnishing action of said wheel, means for adjusting the rest relative to the chuck held staff and to the burnishing wheel and means for locking said rest in adjusted position and means for automatically removing the staff from the retracted chuck.

2. A semi-automatic machine for polishing the pivots of balance staffs, comprising a base, a spindle formed with a chuck engaging end supported by said base for rotation and longitudinal reciprocation, means for rotating said spindle, means for moving said spindle longitudinally of its axis of rotation while rotating, a retractible chuck supporting said staff mounted in the chuck engaging end of said spindle, said spindle moving means serving to retract said chuck, a stop for arresting the longitudinal movement of said chuck while permitting continued movement of said spindle to release said chuck from engagement with said spindle, a rotating burnishing wheel, a rest carried by said base and receiving the pivot end of said staff and supporting said end while in engagement with said burnishing wheel, a tungsten carbide adjustable bearing supporting the staff between said chuck and said rest, means for limiting the burnishing action of said wheel, an adjusting screw engaging said rest supporting base for adjusting said rest relative to said chuck and to said burnishing wheel and means for locking said base and rest in adjusted position, and means for removing the staff from the retracted chuck.

References Cited in the file of this patent

UNITED STATES PATENTS

| | | |
|---|---|---|
| 199,217 | Manning | Jan. 15, 1878 |
| 217,024 | Rogers | July 1, 1879 |
| 771,736 | Manning | Oct. 4, 1904 |
| 827,309 | Holub | July 31, 1906 |
| 1,235,503 | Rosat | July 31, 1917 |
| 2,614,465 | Markert | Oct. 21, 1952 |
| 2,693,631 | Redman | Nov. 9, 1954 |

FOREIGN PATENTS

| | | |
|---|---|---|
| 298,568 | Germany | July 16, 1954 |